UNITED STATES PATENT OFFICE.

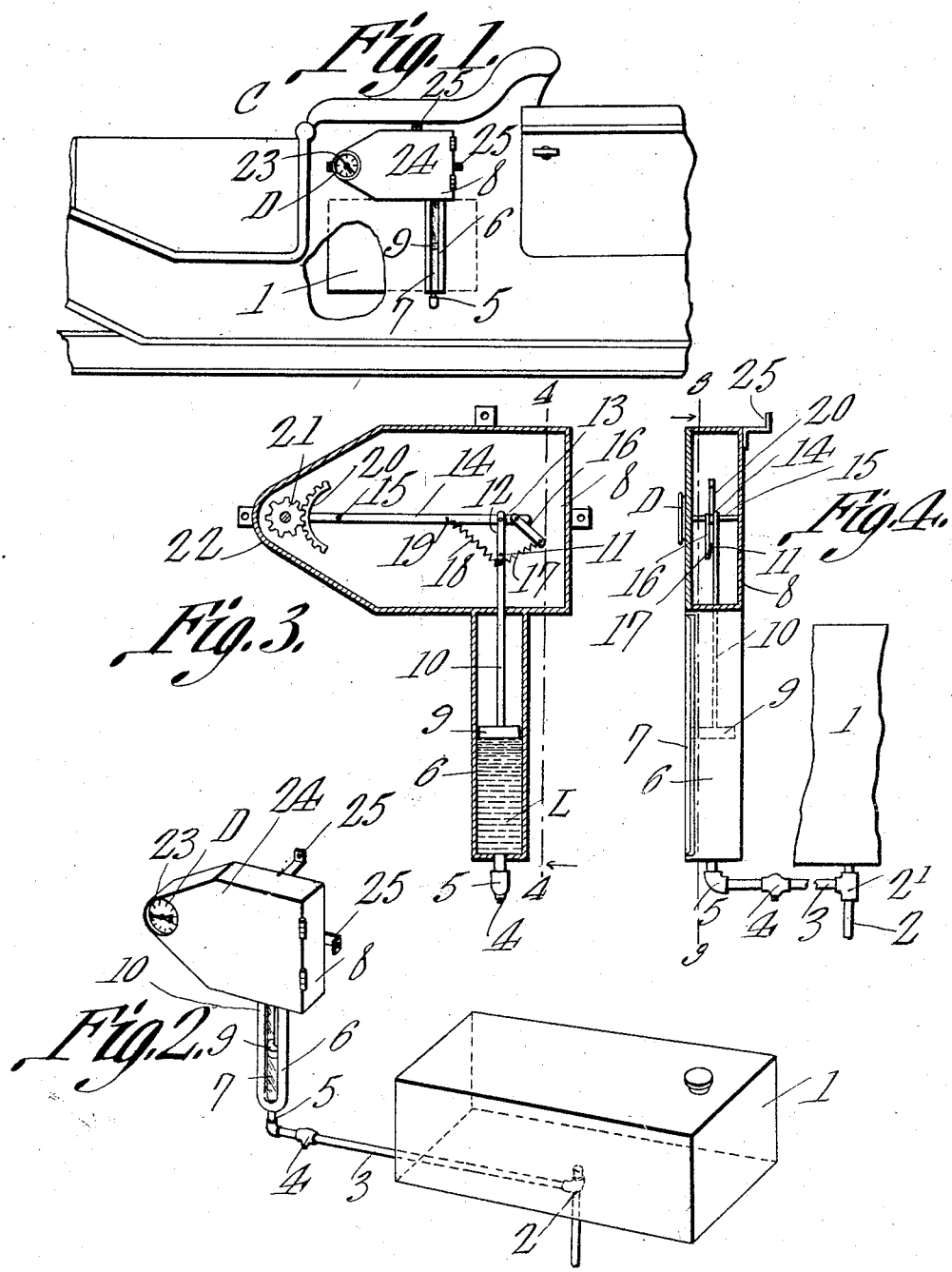

JOSEPH B. TURNER, OF CUERO, TEXAS.

INDICATING ATTACHMENT FOR TANKS.

1,027,936.  Specification of Letters Patent.  Patented May 28, 1912.

Application filed December 4, 1911. Serial No. 663,684.

*To all whom it may concern:*

Be it known that I, JOSEPH B. TURNER, a citizen of the United States, residing at Cuero, in the county of Dewitt and State of Texas, have invented a new and useful Indicating Attachment for Tanks, of which the following is a specification.

The present invention relates to improvements in indicating attachment for tanks, the same being especially applicable for use in connection with gasolene tanks for motor cars, the primary object of the present invention being the provision of an indicating attachment adapted to be connected to the outlet pipe of a gasolene tank whereby the height of the gasolene within the tank is visually recorded, a float attachment being disposed exteriorly of the motor car body and operably connected to an oscillatory hand or pointer disposed in indicating relation to a dial, the attachment being so constructed that it may be readily attached to any gasolene tank or the outlet pipe thereof.

A further object of the present invention is the provision of a novel form of float holding cylinder provided with a vertically disposed sight glass, whereby the elevation or movement of the float therewithin may be observed from the outside, a rod being connected to the float to operate a recorder, the mechanism for operating the same being disposed within a box mounted exteriorly of the motor car body and accessible at all times.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings Figure 1 is a side elevation of a portion of a motor car, the present indicating attachment being displayed in operable relation to the gasolene tank, a portion of the body of the car being broken away to indicate the position of said tank. Fig. 2 is a detailed perspective view of a gasolene tank with the indicating attachment connected thereto. Fig. 3 is a vertical section taken on line 3—3 of Fig. 4. Fig. 4 is a vertical section taken on line 4—4 of Fig. 3.

Referring to the drawings, the numeral 1 designates the gasolene or fuel tank which is disposed within the body of the motor car C, and has leading therefrom an outlet pipe 2 provided with a T-coupling 2', to which is connected a pipe 3, a drain cock 4 being mounted intermediate of the nipple 5 and the pipe 3 to permit the draining of the pipe 3 and also the vertically disposed cylinder or column 6, said cylinder being provided with a transparent vertical slot 7, closed with glass, whereby the contents of the cylinder 6 may be observable from the outside.

As shown in Fig. 1 the float cylinder 6 is adapted to be disposed exteriorly of the motor car body C the same having its upper end connected to the lower wall of the casing or receptacle 8, which is fastened by means of lugs 25 to the side of the motor car as clearly illustrated in Fig. 1. The said float cylinder 6 is so disposed that the fluid L will enter from the bottom thereof and have its level with the fluid within the tank 1 and thereby indicate the height of the liquid within the tank through the glass covered slot 7 of the cylinder 6, and in order to operate an indicating mechanism D, so as to indicate the volume or gallons of the liquid within the tank 1, the float 9 which is preferably made of a light material, such as aluminum or cork, is disposed for vertical movement within the cylinder 6, and is floated by the liquid L therewithin.

Connected to the float 9 and projecting upwardly therefrom through an aperture in the bottom of the casing 8 is a vertically disposed slidable rod 10, whose upper end is pivotally connected at 11 to the lower end of the short link 12, whose upper end is pivotally connected at 13 near the end of the lever 14, said lever being pivotally mounted within the casing 8 upon a shaft 15, and carrying at its extreme end beyond the pivotal point 13 the short arm 16, whose lower end is connected by means of the spring 17 to the rod 10 below the pivotal point 11 thereof, another spring 18 being connected at such point to the rod 10 and at a point 19 to the lever 14, said springs being of such tensions as to normally hold the rod 10 and link 12 in a vertically alined position, but permitting a slight movement without actuating the indicator D due to the movement of the liquid in the cylinder 6 caused by the jolting of the car. A gradual movement vertically up and down of the liquid within the cylinder 6 by the aid of the springs 17 and 18 will lift the long end of the lever 14 in a vertical line so as to cause the geared segment 20 to actuate the gear or pinion 21 disposed within the reduced end 22 of the casing 8, so as to operate the pointer 23 to give a visual indication of the contents of the tank 1.

Hingedly connected to the front of the casing 8 is a door 24 which permits access to the register mechanism within the casing when deemed necessary.

From the foregoing description taken in connection with the drawings, it is evident that a registering or recording attachment such as herein shown and described may be readily attached to any form of gasolene tank without interfering with the present installation, it simply being necessary to properly place the float cylinder 6 so that the rise and fall of the liquid within the reservoir or tank 1 will seek its proper level within the cylinder and thereby actuate the sight float 9 so as to operate the lever 14 and the pointer 23 to indicate the exact volume, or the cubic contents of the tank 1.

By disposing the mechanism exteriorly of the car and in view of the owner or chauffeur, the working parts of the mechanism are removed distantly from the tank and are not affected directly as in most instances, the liquid entering the pipe 3 and into the cylinder 6 from the lower end thereof, and by confining the float 9 within a limited space such as the cylinder 6, the splashing of the gasolene within the tank 1 due to the jarring of the same during the travel of the car, will affect the float 9 to a minimum, whereas where the float is disposed directly within the tank and as is the case in most instances, the float is actuated at all times by the splashing action of the gasolene within the tank and thereby renders the indicating uncertain and continually varying, not due however, to the rise and fall of the gasolene due to the regular use thereof. Should, however, the splashing affect the float 9, any movement of the liquid other than a straight up and down or vertical movement, will slightly oscillate the upper end of the rod 10 and link 12, so as to stretch one or the other of the springs 17 or 18, and not materially affect the indicating mechanism.

What is claimed is:

1. In an indicator attachment for liquid fuel tanks, a vertically disposed cylinder in communication at its lower end with the fuel tank, a float mounted for reciprocatory movement within the cylinder to be actuated by the rise and fall of the liquid fuel therein, an indicating device, a pivoted lever operably connected at one end to the indicating device, a link pivotally connected to the outer free end of said lever, a rod connected to the float and having its upper end pivotally connected to the lower end of said link, and two springs, each connected to the lever at a side of the link opposite that to which the other is connected, the lower end of said springs being connected to the float rod below its pivotal connection with the link, whereby the rod and link are normally held in vertical alinement.

2. In an indicator attachment for liquid fuel tanks, a vertically disposed cylinder in communication at its lower end with the fuel tank, a float mounted for reciprocatory movement within the cylinder to be actuated by the rise and fall of the liquid fuel therein, an indicating device, a pivoted lever operably connected at one end to the indicating device, a link pivotally connected to the outer free end of said lever, a rod connected to the float and having its upper end pivotally connected to the lower end of said link, an arm made fast to the extreme end of the lever, a spring connected to the free end of said arm and to the float rod below its pivotal connection to the link, and another spring connected to the rod at the point of connection of the first spring thereto and to the lever upon the side of its pivotal connection nearer the indicating device.

3. In an indicating attachment for liquid fuel tanks, the combination with a tank, and an outlet leading therefrom, of a conduit connected to said outlet and leading away from the tank, a cylinder vertically disposed and having its lower end in communication with said conduit, said cylinder being provided with a vertically disposed transparent portion the full length thereof, a casing connected to the upper end of said cylinder and supporting the same, a float disposed within said cylinder and actuated by the rise and fall of the liquid fuel therein, a rod connected to said float and extending upwardly within the casing, a link pivotally connected to the upper end of said rod, a lever pivoted within the casing and at right angles to the float rod, an indicating device operably connected to the inner end of said lever, the upper end of said link being pivotally connected to the said lever near the opposite end to the indicating device, and means connected to the lever on opposite sides of the link and to the float rod below its pivotal connection with the link, to retain the float rod and link in vertical alinement.

4. In an indicator attachment for liquid fuel tanks, the combination with a tank, and an outlet leading therefrom, of a conduit connected to said outlet and leading away from the tank, a cylinder vertically disposed and having its lower end in communication with said conduit, said cylinder being provided with a vertically disposed transparent portion the full length thereof, a casing connected to the upper end of said cylinder and supporting the same, a float disposed within said cylinder and actuated by the rise and fall of liquid fuel therein, a rod connected to said float and extending upwardly within the casing, a link pivotally connected to the upper end of said rod, a lever pivoted within the casing and at right angles to the float rod, an indicating device operably connected to the inner end of said lever, the upper end of said link being pivotally connected to said lever near the opposite end of the indicating device, and two springs having their lower ends connected to the float rod below its pivotal connection with the lower end of the link, and having their other ends disposed in opposite directions and connected to the lever upon opposite sides of the pivotal point thereof with the link.

In testimony that I claim the foregoing as my own, I have hereto affixed my signature in the presence of two witnesses.

JOSEPH B. TURNER.

Witnesses:
F. E. BUNGER,
W. T. HINES.

---

Copies of this patent may be obtained for five cents each, by addressing the "Commissioner of Patents, Washington, D. C."